United States Patent Office 2,921,067
Patented Jan. 12, 1960

2,921,067
METHOD OF MAKING CARBOCYANINE AND MEROCARBOCYANINE SPECTRAL SENSITIZING DYES

Henri Larive, Clichy, and Edouard M. Geiger, Neuilly (Seine), France, assignors to Eastman Kodak Company, Rochester, N.Y., a corporation of New Jersey No Drawing. Application July 10, 1957
Serial No. 670,870

Claims priority, application France April 3, 1957

4 Claims. (Cl. 260—240.65)

This invention relates to an improved method for making symmetrical or unsymmetrical carbocyanine dyes and merocarbocyanine dyes, many of which are useful as sensitizers for photographic silver halide emulsions.

It is known that symmetrical carbocyanine dyes can be prepared by condensing an orthoester, such as triethyl orthoformate, with a cyclammonium quaternary salt containing a reactive methyl group. Generally, these condensations are carried out according to the process of F. M. Hamer as described in "Jour. Chem. Soc." (Transactions, 1928), pages 3160-3. This process uses an active basic solvent, such as pyridine, in the condensation. Generally, in such condensations, the quaternary salt is dissolved in pyridine, with heating when necessary, the orthoester added, and the reaction mixture refluxed for the desired period of time. Study of this reaction indicates that the mechanism is not a simple one. There is some evidence that the quaternary salt is first dequaternated to the corresponding methylene base before reaction with the orthoester, although such evidence is by no means conclusive. There is some further evidence that this methylene base is capable of undergoing polymerization under certain conditions and that considerable quantities of by-products, the elimination of which is difficult, are formed.

Other difficulties are generally present when pyridine alone is used as the active solvent in the orthoester synthesis. For some unexplained reason, the orthoformates appear to have considerably greater reactivity than the higher orthoesters, such as orthoacetates, orthopropionates, etc. Also, certain quaternary salts containing a reactive methyl group appear to be more readily reacted than others. This varies from one type of heterocyclic nucleus to another type, and also within a given class depending upon the particular acid anion attached to the nitrogen atom of the heterocyclic nucleus. It is known, for example, that benzoxazole quaternary salts containing a reactive methyl group in the 2-position do not react with orthoformates in the presence of pyridine alone to yield any isolatable amounts of dye. Similar unexplained low yields result in the attempted preparation of naphthothiazole dyes.

It is, accordingly, an object of our invention to provide an improved method of making symmetrical or unsymmetrical carbocyanine dyes. Another object is to provide a method of making symmetrical carbocyanine dyes without the attendant formation of undesirable by-products. Still another object is to provide an improved method for making merocarbocyanine dyes. A further object is to provide an improved method for making symmetrical or unsymmetrical carbocyanine dyes and merocarbocyanine dyes in materially increased yields. Other objects will become apparent from a consideration of the following description and examples.

According to our invention, we prepare symmetrical carbocyanine dyes by condensing a cyclammonium quaternary salt selected from those represented by the following general formula:

I.
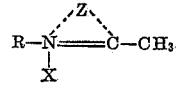

wherein R represents an alkyl group, such as methyl, ethyl, carbethoxymethyl, carbomethoxymethyl, β-carbethoxyethyl, etc. (e.g., a lower alkyl group), X represents an acid radical, such as chloride, bromide, iodide, benzenesulfonate, p-toluenesulfonate, ethylsulfate, methylsulfate, etc., and Z represents the non-metallic atoms necessary to complete a heterocyclic nucleus containing from 5 to 6 atoms in the heterocyclic ring, such as those selected from the group consisting of those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g., naphtho[1,2]thiazole, naphtho[2,1]thiazole, 5-methoxynaphtho[2,1]thiazole, 5-ethoxynaphtho[2,1]thiazole, 8-methoxynaphthol[1,2]thiazole, 7-methoxynaphtho[1,2]thiazole, etc.), those of the benzoxazole series (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g., naphthol[1,2]oxazole, naphtho[2,1]oxazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., naphtho[1,2]selenazole, naphtho[2,1]selenazole, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), etc., with an orthoester selected from those represented by the following general formula:

II.  $R_1-C(OR_2)_3$ wherein $R_1$ represents a hydrogen atom or an alkyl group, such as methyl, ethyl, etc. (particularly a lower alkyl group) and $R_2$ represents an alkyl group, such as methyl, ethyl, etc. (particularly a lower alkyl group). These condensations are carried out under substantially anhydrous conditions using an inactive solvent consisting of tricresylphosphate or a phenol, together with a basic condensing agent consisting of an alkali metal hydroxide (e.g., sodium hydroxide, potassium hydroxide, etc.), or an organic tertiary amine having a dissociation constant greater than pyridine.

Phenols useful in our condensations include monohydric phenols, such as phenol, o-, m-, and p-cresols or mixtures thereof, chlorinated phenols, etc. (e.g., a monohydric phenol containing from 6 to 7 carbon atoms). Sufficient phenol or tricresyl phosphate is employed to keep the reaction medium liquid during the course of the condensation. The most useful amount of solvent will depend, of course, somewhat upon the particular reactants, but can be determined by making a series of condensations wherein the quantity of solvent to reactants is varied.

The organic tertiary amine condensing agents include the trialkylamines (e.g., triethylamine, tri-n-propylamine, tri-n-butylamine, etc.), the N,N-dialkylanilines (e.g., N,N-dimethylaniline, N,N-diethylaniline, etc.), the N-alkylpiperidines (e.g., N-methylpiperidine, N-ethylpiperidine, etc.), etc. However, the trialkylamines, and triethylamine in particular, have been found to be outstanding in the method of our invention. The quantity of condensing agent used is generally on a molecular equivalent basis to the quantity of orthoester taking place in the reaction. Frequently, it is advantageous to use an excess of orthoester.

In preparing symmetrical carbocyanine dyes according to our invention, it is frequently advantageous to heat together the cyclammonium quaternary salt of Formula I and the orthoester of Formula II for a short time, prior to the addition of the condensing agent, such as triethylamine. The temperature during the initial heating period before the basic condensing agent is added can be varied, although we have found that it is generally advisable to keep the temperature below 100° C. After the basic condensing agent has been added, the temperature can be allowed to rise above 100° C.

The symmetrical carbocyanine dyes obtained according to our invention can be represented by the following general formula:

III.

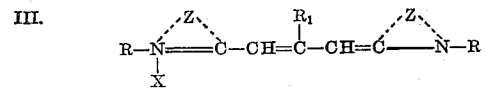

wherein R, $R_1$, Z and X each have the values given above.

According to our invention, we prepare merocarbocyanine dyes by condensing a cyclammonium quaternary salt selected from those represented by Formula I above with a ketomethylene compound selected from those represented by the following general formula:

IV.

wherein Q represents the non-metallic atoms necessary to complete a heterocyclic nucleus containing from 5 to 6 atoms in the heterocyclic ring, such as those of the pyrazolinone series (e.g., 3-methyl-1-phenyl-5-pyrazolinone, 1-phenyl-5-pyrazolinone, 1-(2-benzothiazolyl)-3-methyl-5-pyrazolinone, etc.), those of the isoxazolinone series (e.g., 3-phenyl-5(4H)-isoxazolinone, 3-methyl-5(4H)-isoxazolinone, etc.), those of the oxindole series, (e.g., 1-alkyl-2,3-dihydro-2-oxindoles, etc.), those of the 2,4,6-triketohexahydropyrimidine series (e.g., barbituric acid or 2-thiobarbituric acid as well as their 1-alkyl (e.g., 1-methyl, 1-ethyl, 1-n-propyl, 1-n-heptyl, etc.), or 1,3-dialkyl (e.g., 1,3-dimethyl, 1,3-diethyl, 1,3-di-n-propyl, 1,3-diisopropyl, 1,3-dicyclohexyl, 1,3-di($\beta$-methoxyethyl), etc.), or 1,3-diaryl (e.g., 1,3-diphenyl, 1,3-di(p-chlorophenyl), 1,3-di(p-ethoxycarbonylphenyl), etc.), or 1-aryl (e.g., 1-phenyl, 1-p-chlorophenyl, 1-p-ethoxycarbonylphenyl), etc.) or 1-alkyl-3-aryl (e.g., 1-ethyl-3-phenyl, 1-n-heptyl-3-phenyl, etc.) derivatives), those of the rhodanine series (i.e., 2-thio-2,4-thiazolidinedione series), such as rhodanine, 3-alkylrhodanines (e.g., 3-ethylrhodanine, 3-allylrhodanine, etc.) or 3-arylrhodanines (e.g., 3-phenylrhodanine, etc.), etc., those of the 2-thio-2,4-oxazolidinedione series (i.e., those of the 2-thio-2,4(3H,5H)-oxazoledione series) (e.g., 3-ethyl-2-thio-2,4-oxazolidinedione, etc.), those of the 2-thio-2,5-thiazolidinedione series (i.e., the 2-thio-2,5(3H,4H)-thiazoledione series) (e.g., 3-ethyl-2-thio-2,5-thiazolidinedione, etc.), those of the 2,4-thiazolidinedione series (e.g., 2,4-thiazolidinedione, 3-ethyl-2,4-thiazolidinedione, 3-phenyl-2,4-thiazolidinedione, 3-$\alpha$-naphthyl-2,4-thiazolidinedione, etc.), those of the thiazolidinone series (e.g., 4-thiazolidinone, 3-ethyl-4-thiazolidinone, 3-phenyl-4-thiazolidinone, 3-$\alpha$-naphthyl-4-thiazolidinone, etc.), those of the 4-thiazolinone series (e.g., 2-ethylmercapto-4-thiazolinone, 2-alkylphenylamino-4-thiazolinones, 2-diphenylamino-4-thiazolinone, etc.), those of the 2-imino-2,4-oxazolinone (i.e., pseudohydantoin) series, those of the 2,4-imidazolinedione (hydantoin) series (e.g., 2,4-imidazolinedione, 3-ethyl-2,4-imidazolinedione, 3-phenyl-2,4-imidazolinedione, 3-$\alpha$-naphthyl-2,4-imidazolinedione, 1,3-diethyl-2,4-imidazolinedione, 1-ethyl-3-$\alpha$-naphthyl-2,4-imidazolinedione, 1,3-diphenyl-2,4-imidazolinedione, etc.), those of the 2-thio-2,4-imidazolinedione (i.e., 2-thiohydantoin) series (e.g., 2-thio-2,4-imidazolinedione, 3-ethyl-2-thio-2,4-imidazolinedione, 3-phenyl-2-thio-2,4-imidazolinedione, 3-$\alpha$-naphthyl-2-thio-2,4-imidazolinedione, 1,3-diethyl-2-thio-2,4-imidazolinedione, 1-ethyl-3-phenyl-2-thio-2,4-imidazolinedione, 1-ethyl-3-$\alpha$-naphthyl-2-thio-2,4-imidazolinedione, 1,3-diphenyl-2-thio-2,4-imidazolinedione, etc.), those of the 5-imidazolinone series (e.g., 2-n-propylmercapto-5-imidazolinone, etc.), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom), in the presence of an orthoester selected from those represented by Formula II above, a phenol or tricresylphosphate solvent and a strongly basic condensing agent, such as those described above. Again, the quantity of basic condensing agent used is about equal to the quantity of orthoester used, since it will be noted that the reaction proceeds using one molecule of each. Of course, an excess of one reactant over the other can be employed if desired. In general, a slight excess of orthoester over the required theoretical amount is employed.

The merocarbocyanine dyes obtained according to our invention can be represented by the following general formula:

V.

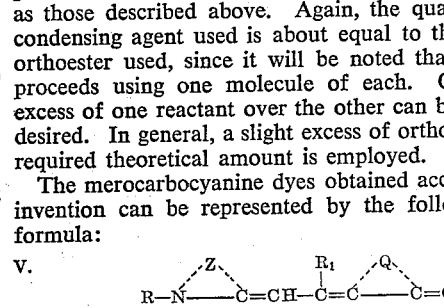

wherein R, $R_1$, Z and Q each have the values given above.

In the preparation of unsymmetrical merocarbocyanine dyes, we generally prefer to carry out the reaction in two separate steps. First, a cyclammonium quaternary salt of the type represented by Formula I above is dissolved in a suitable solvent, such as methanol, ethanol, etc., and sufficient trialkylamine, such as triethylamine, added to liberate the methylene base of the quaternary salt. The methylene base can then be separated from the liquid medium. The resulting methylene bases can be represented by the following general formula:

Ia.

$$R'-N\diagup Z' \diagdown C=CH_2$$

wherein R' represents an alkyl group, such as those illustrated above for R, while Z' represents the non-metallic atoms necessary to complete a heterocyclic nucleus, such as those represented above for Z. After the methylene base of Formula Ia has been obtained, a second cyclammonium quaternary salt is heated together with an orthoester of Formula II in the presence of a phenolic solvent for a short period of time. The methylene base is then slowly added to the reaction mixture and the temperature raised to reaction conditions. During the final condensation, no strongly basic condensing agent is necessary. The resulting unsymmetrical carbocyanine dyes can be represented by the following general formula:

VI.

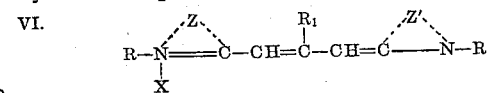

wherein R, $R_1$, R', Z, Z' and X each have the values given above.

It appears that the initial heating between the cyclammonium quaternary salt of Formula I with the orthoester of Formula II in the presence of the tricresylphosphate or phenol solvent results in the formation of an intermediate which can be represented by the following general formula:

VII.

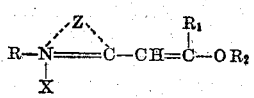

wherein R, $R_1$, $R_2$, Z and X each have the values given above. It is not necessary to attempt separation of the above intermediate, but successive steps can be carried out without separation of this intermediate. In the case of the preparation of symmetrical carbocyanine dyes, it is only necessary to add basic condensing agent to the reaction mixture containing the intermediate of Formula VII, unreacted cyclammonium quaternary salt of Formula I and solvent, followed by heating to effect condensation leading to the formation of the dye represented by Formula III. In the case of the preparation of unsymmetrical carbocyanine dyes, the methylene base of Formula I is reacted with the intermediate of Formula VII in the presence of a phenolic solvent to produce the unsymmetrical dyes of Formula VI.

In the condensations of our invention, materially improved results have been obtained in those cases wherein the orthoester of Formula II is a higher orthoester, i.e., $R_1$ represents an alkyl group. Using the orthoesters of Formula II wherein $R_1$ is a hydrogen atom or an alkyl group, the reaction temperature can vary from about 50° to 150° C. The particular reaction temperature will, of course, vary depending upon the reactants employed. Since the alkali metal hydroxide condensing agents useful in our invention are neutralized during the condensations, the water resulting from the neutralization can be effectively removed either by means of a chemical water-binding agent, such as calcium chloride, or by adding a liquid, such as benzene, which forms an azeotropic mixture with the water. It is thus possible to maintain the reaction mixture in substantially anhydrous condition throughout the condensations. Of course, it is not necessary to use a liquid which forms an azeotrope when an organic tertiary amine is employed as the condensing agent.

In general, we have found that especially good results have been obtained in our condensations when a phenol, as contrasted with tricresylphosphate, is employed as the reaction vehicle.

The following examples will serve to illustrate more fully the manner of practicing our invention.

*Example 1.—5,5'-diphenyl-3,3',9-triethyloxacarbocyanine bromide*

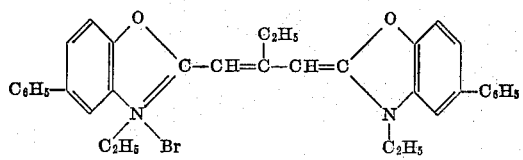

(a) *From 2-methyl-5-phenylbenzoxazole ethylsulfate.*—36.5 g. (1 mol.) of 2-methyl-5-phenylbenzoxazole ethylsulfate were introduced into a 250 cc. three-necked flask containing 20 g. of anhydrous phenol and 26.5 g. (0.5 mol.+200% excess) of ethyl orthopropionate. The reaction mixture was then heated to 80° C. while stirring. Then 20 g. (0.5 mol.+100% excess) of triethylamine were added at one time and the reaction mixture heated at 100–110° C. for 40 minutes. After cooling the reaction mixture, the desired dye was precipitated by adding isopropyl ether (2 to 3 volumes). The reaction mixture was allowed to cool for several hours and the precipitated dye obtained by decantation. The dye was dissolved in 35 cc. of warm pyridine and the solution poured into a warm solution of potassium bromide (25 g. in 50 cc. of water). The dye precipitated as the bromide and the mixture was cooled. The liquid was decanted off and the dye remaining was washed with cold water, then with a little ether. A paste of the dye was made with a little cold acetone and it was allowed to crystallize for several hours. The dye was then filtered off and dried. The crude yield was 16.5 g. per 56%. After recrystallizing the dye in 170 cc. of acetic acid, there were obtained 15 g. of pure dye.

(b) *From 2-methyl-5-phenylbenzoxazole ethobromide.*—100 g. (1 mol.) of 2-methyl-5-phenylbenzoxazole were introduced into a glazed bomb and 65.0 g. (1 mol.+25% excess) of ethylbromide added. The mixture was heated at 100° C. for 60 hours. After cooling, the viscous mass was washed with ether and then introduced into a 1-liter flask provided with a cooling column and a mechanical stirrer. 100 g. of phenol, 183 g. (1 mol.+200% excess) of triethylamine were added at one time. The reaction mixture was then heated at 120° C. for 2 hours while stirring. The dye which separated was washed with ether and then with acetone. It was collected on a filter and dried. The crude yield was 45.0 g. This was about the same yield that was obtained by starting from 2-methyl-5-phenylbenzoxazole and ethylsulfate (i.e., beginning with quaternation of these materials).

*Example 2.—3,3'-diethyl-9-methyl-4,5,4',5'-dibenzothiacarbocyanine chloride*

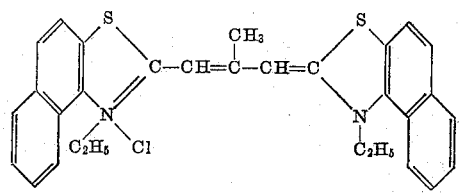

39.9 g. (1 mol.) of 2-methyl-β-naphthothiazole etho-p-toluenesulfonate, 30 cc. of m-cresol, 8 cc. (0.5 mol.+15% excess) of triethylamine and 18 cc. (0.5 mol.+100% excess) of ethyl orthoacetate were placed in a 250 cc. flask equipped with stirrer and a refrigerating column. The flask was then immersed in an oil bath and heated at 110–120° C. for one hour. After cooling, the precipitated reaction product was washed 3 times with 100 cc. portions of ether in order to eliminate the m-cresol. 150 cc. of ethyl alcohol were added to the dye and the solution brought to boiling. This was then poured into a warm solution of 12 g. of ammonium chloride in 30 cc. of water. The mixture was then boiled for 15 minutes, then cooled. The precipitated dye was filtered off, washed on a Büchner funnel with copious quantities of warm water, then acetone and finally ether. The crude yield was 19 g. or 75%.

The crude dye was recrystallized from methyl alcohol (6 cc./g. of dye). The yield of pure dye was 13 g. or 51%.

*Example 3.—3,3'- diethyl - 9 - methylselenacarbocyanine bromide*

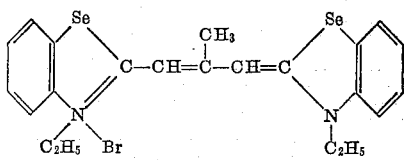

(a) *From 2-methylbenzoselenazole ethobromide.*—30.5 g. (1 mol.) of 2-methylbenzoselenazole ethobromide, 20 g. of phenol and 18 cc. (0.5 mol.+100% excess) of ethyl orthoacetate were placed in a 250 cc. flask equipped with a stirrer and a refrigerating column. The flask was placed in an oil bath and heated at 80° C. for 10 minutes. Then 9 cc. (0.5 mol.+30% excess) of triethylamine were added at one time. While stirring, the reaction mixture was heated at 110° C. for 45 to 60 minutes. The reaction mixture was cooled and the precipitated dye collected on a filter. It was washed 2 times with 100 cc. of ether. The precipitated dye was drained on a suction filter and washed with acetone, then ether. It was recrystallized from 800 cc. of methyl alcohol. There were obtained 17.5 g. (or 63%) of dye.

(b) *From 2 - methylbenzoselenazole etho - p - toluenesulfonate.*—20 g. of distilled phenol, 18 g. (0.5 mol. +100% excess) of ethyl orthoacetate and 39.6 g. (1 mol.) of 2-methylbenzoselenazole etho-p-toluenesulfonate were placed in a 250 cc. flask equipped with a stirrer and a refrigerating column. The flask was placed in an oil bath and heated at 90° C. for 10 minutes. 8 cc. (1 mol. +15% excess) of triethylamine were poured into the reaction mixture at one time. After heating at about 110° C. for one hour, the mixture was cooled. The reaction mixture was twice washed with 150 cc. of ether (removed by decantation). The residual oil was recovered with 150 cc. of methyl alcohol. The methyl alcohol solution was heated to boiling and a warm solution of 15 g. of potassium bromide in 30 cc. of water added. The mixture was heated under reflux for 15 minutes, then cooled. The dye precipitated and it was collected on a Büchner funnel, washed with water, then acetone, then ether. The crude yield was 24 g. or 87%. It was recrystallized from methyl alcohol (40 cc./g. of dye) to yield 20 g. (or 72%) of pure dye.

In exactly the manner shown in Examples 1 to 3 above, other cycloammonium quaternary salts embraced by Formula I were reacted with the orthoesters of Formula II. The reaction conditions and yields are summarized in the following table. In this table, data are given on prior art solvents, such as pyridine, for purposes of comparison. In all cases, it will be seen that the particular solvents of our invention provide materially increased yields (crude or pure).

bath to the point of precipitation and 16 cc. (1 mol. +10% excess) of triethylamine added. The methylene base precipitated. The mixture was allowed to stand at a temperature below 50° C. for 20 minutes. The methylene base was collected on a filter with suction, washed with acetone, then with ether or ethyl acetate. The yield of methylene base was 15 g. or 94%.

28.9 g. of 2-methylbenzoxazole ethiodide, 22 cc. of ethyl orthoacetate and 50 cc. of m-cresol were placed in a flask equipped with a stirrer. The reaction mixture was heated on an oil bath for 15 minutes at 120° C., then allowed to return to room temperature. 16.3 g. of methylene base obtained as described above were added dropwise from solution in 40 cc. of methanol. The mixture was heated to 100° C. for 15 minutes, cooled and the dye precipitated with ether. It was collected on a filter with suction, recrystallized from pyridine and again collected on a filter. After washing with cool alcohol, there were obtained 33 g. (or 70%) of dye.

*Analysis.*—Calcd. for N, 5.8%; S, 6.7%. Found: N, 5.9%; S, 6.9%.

*Example 14.*—5' - chloro - 3,3' - diethyl - 9 - methylselenathiacarbocyanine bromide

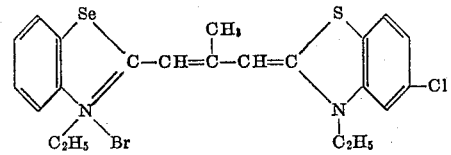

38.3 g. (1 mol.) of 5-chloro-2-methylbenzothiazole etho-p-toluenesulfonate were dissolved in the minimum quantity of ethyl alcohol with warming. The solution

| Example | | Quaternary Salt | Orthoester | Solvent | Cond. Agent | Percent Yield | | Dye obtained as— |
|---|---|---|---|---|---|---|---|---|
| | | | | | | Crude | Recrys. | |
| 4 | (a) | 2-methylbenzoxazole ethiodide | acetate | pyridine | pyridine | 15 | | iodide. |
| | (b) | do | do | m-cresol | triethylamine | 76 | | Do. |
| | (c) | do | do | do | diethylamine | 23 | | Do. |
| 5 | (a) | 2-methyl-5-phenylbenzoxazole ethylsulfate. | propionate | pyridine | triethylamine | | 20 | bromide. |
| | (b) | do | do | m-cresol | do | 50 | 45 | Do. |
| | (c) | do | do | phenol | do | 60 | 50 | Do. |
| 6 | (a) | 2-methylbenzothiazole etho-p-toluenesulfonate. | acetate | pyridine | pyridine | 60 | | chloride. |
| | (b) | do | do | tricresylphosphate | NaOH | | 80 | Do. |
| | (c) | do | do | m-cresol | triethylamine | | 90 | Do. |
| | (d) | do | do | ethanol | do | 65 | | Do. |
| 7 | (a) | 2-methylbenzothiazole methiodide. | do | pyridine | pyridine | 75 | | iodide. |
| | (b) | do | do | m-cresol | triethylamine | 100 | | Do. |
| 8 | (a) | 5-chloro-2-methylbenzothiazole etho-p-toluenesulfonate. | propionate | pyridine | pyridine | | 60 | chloride. |
| | (b) | do | do | tricresylphosphate | NaOH | | 80 | Do. |
| | (c) | do | do | phenol | triethylamine | | 80 | Do. |
| 9 | (a) | 5-chloro-2-methylbenzothiazole ethiodide. | do | pyridine | pyridine | nil | | iodide. |
| | (b) | do | do | m-cresol | triethylamine | 42 | | Do. |
| 10 | (a) | 2 - methyl - β - naphthothiazole etho-p-toluenesulfonate. | acetate | pyridine | pyridine | | 10 | chloride. |
| | (b) | do | do | m-cresol | triethylamine | | 50 | Do. |
| | (c) | do | do | tricresylphosphate | NaOH | | 55 | Do. |
| 11 | (a) | 2-methylbenzoselenazole etho-p-toluenesulfonate. | do | pyridine | pyridine | 52 | 40 | bromide. |
| | (b) | do | do | phenol | triethylamine | 85 | 70 | Do. |
| 12 | (a) | 2-methylbenzoselenazole ethobromide. | do | pyridine | pyridine | nil | | Do. |
| | (b) | do | do | m-cresol | triethylamine | 55 | | Do. |
| | (c) | do | do | phenol | do | 72 | | Do. |
| | (d) | do | do | chlorophenol | do | 80 | | Do. |
| | (e) | do | do | ethanol | do | 15 | | Do. |

*Example 13.*—3',9-dimethyl-3-ethyloxathiacarbocyanine iodide

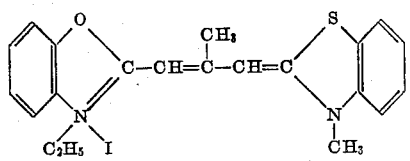

27.5 g. (1 mol.) of 2-methylbenzothiazole methylsulfate were dissolved with warming in the minimum quantity of methanol. The solution was cooled on an ice bath to the point where the quaternary salt began to precipitate and 16 cc. (1 mol.+10% excess) of triethylamine added at one time. The temperature rose and the solution cooled to 2–3° C. for 15 minutes. The methylene base precipitated and was collected on a filter with suction, washed with cold acetone, then ether. The yield was 90%.

30.5 g. of 2-methylbenzoselenazole ethobromide, 22 cc. of ethyl orthoacetate and 50 cc. of m-cresol were placed in a flask equipped with a stirrer. The reaction mixture was heated on an oil bath for 15 minutes at 120° C. and the temperature then allowed to return to ambient temperature. 21 g. of methylene base obtained as above were added drop by drop and with agitation from solution in 40 cc. of m-cresol. The reaction mixture was heated at 100° C. for 15 minutes and then cooled. The dye was separated from solution by precipitation of diethyl ether. It was recrystallized from pyridine. The yield was 35 g. or 64%.

Analysis.—Calcd. for N, 5.18%. Found: 5.17%.

*Example 15.—3',9 - dimethyl - 3 - ethyl - 4,5 - benzothiacarbocyanine methylsulfate*

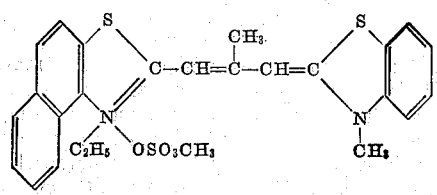

3-ethyl-2-methylene-β-naphthothiazole.—20 g. of 2-methyl-β-naphthothiazole etho-p-toluenesulfonate were dissolved in 25 cc. of warm methanol. After cooling, 5.5 g. of triethylamine were added and the mixture cooled at 2–3° C. for 45 minutes. The precipitated methylene base was separted by filtration and washed on the filter with ether and then dried. The yield was 90%.

27.5 g. of 2-methylbenzothiazole, 22 cc. of etho orthoacetate and 50 cc. of m-cresol were introuceed into a 250 cc. flask equipped with a stirrer. The reaction mixture was heated on an oil bath at 120° C. for 15 minutes. It was then cooled and 22 g. of methylene base (obtained as described above) dissolved in 40 cc. of m-cresol were added little by little. The reaction mixture was cooled and the dye precipitated with ether. The dye was recrystallized from ethyl alcohol. The yield was 38 g. (or 72%).

Analysis.—Calcd. for N, 5.32%. Found: 5.31%.

*Example 16.—2 - diphenylamino - 5 - [(3 - ethyl - 2(3H)-benzothiazolylidene)ethylidene]-4-thiazolinone*

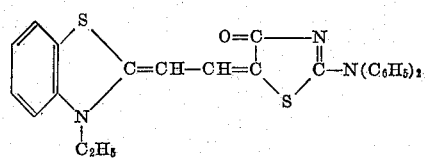

30 cc. of m-cresol, 30.5 g. (1 mol.) of 2-methylbenzothiazole ethiodide, 13 cc. (1 mol.) of triethylamine, 26.8 g. (1 mol.) of 2-diphenylamino-4-thiazolinone and 35 cc. (1 mol.+75% excess) of ethyl orthoformate were placed in a 250 cc. flask equipped with a stirrer and a refrigerating column. The mixture was then heated on an oil bath for one hour at 110–120° C. The reaction product, after cooling, was washed three times with 100 cc. of ether in order to eliminate the m-cresol. The crystalline mass was collected on a filter by suction and washed with acetone, then ether. The crude dye was then dissolved in ethyl alcohol (150 cc./g. of dye). The solution was filtered to remove any insoluble material and then cooled. The dye precipitated and was collected on a filter, then dried. There were obtained 20 g. (or 44% of dye.

*Example 17.—3 - ethyl - 5 - [(3 - ethyl - 2(3H) - benzothiazolylidene)isopropylidene] - 2 - thio - 2,4 - oxazolidinedione*

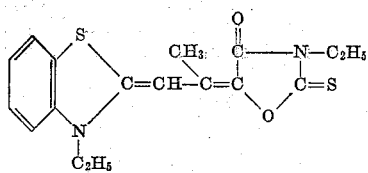

34.5 g. of 2-methylbenzothiazole etho-p-toluenesulfonate were dissolved in 50 cc. of m-cresol. 22 cc. of ethyl orthoacetate were added and the mixture heated at 120° C. for 15 minutes. It was then cooled and 14.5 g. of 3-ethyl-2-thio-2,4-oxazolidinedione were added while stirring. 16 cc. of triethylamine were also added. The mixture was heated for one hour on a water bath and then cooled. The precipitated dye crystals were collected on a filter with suction and washed with ether. The yield of crude dye was 15.8 g. After recrystallization from dimethylformamide (6 cc./g. of dye), the yield was 13.2 g. or 38%.

Analysis.—Calcd. for N, 8.09%. Found: 8.10%.

*Example 18.—3 - ethyl - 5 - [(3 - ethyl - 2(3H) - benzoxazolylidene)isopropylidene] - 2 - thio - 2,4 - oxazolidinedione*

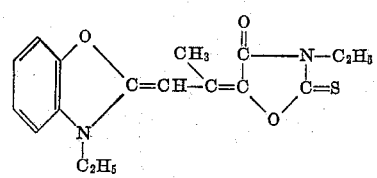

In exactly the manner described in Examples 16 and 17, this dye was obtained starting from 28.9 g. of 2-methylbenzoxazole ethiodide. It was recrystallized from dimethylformamide to give 20 g. of dye (60% of theory).

*Example 19.—4 - [(1 - ethyl - 2(1H) - naphtho[1,2]thiazolylidene)isopropylidene] - 3 methyl - 1 - phenyl-5-pyrazolinone*

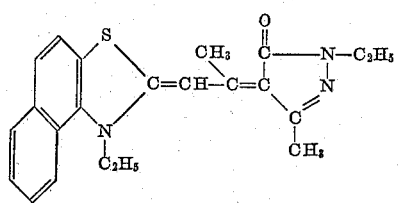

In exactly the same manner, starting from 39.9 g. of quaternary salt and 17.4 g. of 3-methyl-1-phenyl-5-pyrazolinone, there were obtained 22 g. of dye (59% of theory).

Analysis.—Calcd. for N, 11.14%. Found: 11.00%.

*Example 20.—3,3' - diethyl - 9 - methyl - 4,5,4',5' - dibenzothiacarbocyanine chloride*

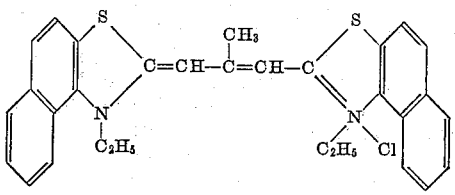

900 ml. of tricresylphosphate were placed in a three-necked 5-liter flask, provided with a good agitator, a condenser containing calcium chloride, a thermometer, and resting on a heating jacket. The temperature was raised to 90° C., and 120 g. of 2-methyl-β-naphthothiazole etho-p-toluenesulfonate were added. The mixture was thoroughly agitated for 5 minutes and 105 ml. of ethyl orthoacetate added all at once. Over a period of 5 to 7 minutes, a suspension of 7.5 g. of finely ground sodium hydroxide in 450 ml. of anhydrous xylene was added. Then 50 g. of calcium chloride (dehydrating agent) was added and the temperature raised to 125° C. A vigorous reaction ensued, resulting in the formation of a foam. The temperature was lowered to 115° C., the refluxing remaining constant. Heating was discontinued at the end of 45 minutes and the temperature reduced to 100° C. over a period of 15 minutes.

The resulting dye in the form of its toluenesulfonate was converted to the corresponding dye chloride by adding 300 g. of ammonium chloride and 1800 ml. of hot water. The mixture was vigorously agitated while keeping the temperature at 75° C. for 15 minutes. Sufficient ice was added to reduce the temperature to 40° C. and 1500 ml. of benzene added. The mixture was agitated for 30 minutes and then filtered through a Büchner funnel. The filtrate was dried in an oven for 12 hours and then recrystallized in 210 ml. of methanol. After chilling the methanol solution to −15° C. for 6 hours in order to precipitate all of the desired dye, the resulting mixture was filtered, washed with water and dried. The yield of pure dye was 55%.

Many of the sensitizing dyes obtained according to the above examples are useful in altering the sensitivity of photographic silver halide emulsions, as is well known to those skilled in the art. In order to sensitize photographic silver halide emulsions using such dyes, it is only necessary to dissolve the dyes in an innocuous solvent, such as methanol, pyridine, etc., or mixtures of solvents, and add these solutions to the finished emulsions. The dyes can be added directly to the emulsions, although it is generally preferable to dissolve them in a suitable solvent and add them to the emulsions in their dissolved state. The amount of dye necessary to produce an optimum sensitizing effect varies with the dye, the solvent used and the particular type of photographic emulsion employed. In general, from 5 to 100 mg. of dye per mol. of silver halide serves to produce an optimum sensitizing effect.

By tricresylphosphate, we mean o-, m- or p-tricresylphosphates, or mixtures thereof. As noted above, the phenolic solvents have been found to be especially outstanding in providing the beneficial effects of our invention.

In the preparation of symmetrical carbocyanine dyes by the process of the invention, it is often advantageous, chiefly when using quantities which are markedly larger than those used in the laboratory, to carry out the reaction in two separate steps. First, one mole of a cyclammonium salt of the type represented by Formula I above is heated with one mole of an orthoester of Formula II for a sufficient time (10–45 minutes) at a suitable temperature which generally is not over 100° C. Then a second mole of the cyclammonium salt of the type represented by Formula I is added, followed by a very slight excess of the basic condensation agent. The mixture is then heated for 30–45 minutes at the refluxing temperature of the alcohol formed during the reaction.

What we claim as our invention and desire secured by Letters Patent of the United States is:

1. In a process for preparing polymethine dyes comprising heating to a temperature of from 50° to 150° C. a molecule of a compound selected from those represented by the following general formula:

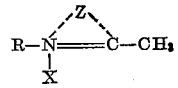

wherein R represents a lower alkyl group, X represents an acid anion and Z represents the non-metallic atoms necessary to complete a heterocyclic nucleus selected from the group consisting of a benzothiazole nucleus, a naphthothiazole nucleus, a benzoxazole nucleus, a naphthoxazole nucleus, a benzoselenazole nucleus, a naphthoselenazole nucleus, and a 2-quinoline nucleus with a molecule of an orthoester selected from those represented by the following general formula:

$$R_1 — C(OR_2)_3$$

wherein $R_1$ represents a member selected from the group consisting of a hydrogen atom and a lower alkyl group and $R_2$ represents a lower alkyl group, and a molecule of a compound selected from those represented by the following two general formulas:

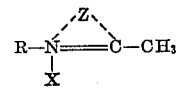

and

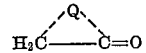

wherein R represents a lower alkyl group, X represents an acid anion, Z represents a member selected from the group consisting of a benzothiazole nucleus, a naphthothiazole nucleus, a benzoxazole nucleus, a naphthoxazole nucleus, a benzoselenazole nucleus, a naphthoselenazole nucleus, and a 2-quinoline nucleus, and Q represents a member selected from the group consisting of a 2,4,6-triketohexahydropyrimidine nucleus, a pyrazolinone nucleus, an isoxazolinone nucleus, an oxindole nucleus, a rhodanine nucleus, a 2-thio-2,4-oxazolidinedione nucleus, a 2-thio-2,5-thiazolidinedione nucleus, a 2,4-thiazolidinedione nucleus, a thiazolidinone nucleus, a 4-thiazolinone nucleus, a 2-imino-2,4-oxazolinone nucleus, a 2-imino-2,4-oxazolinone nucleus, a 2,4-imidazolinedione nucleus, a 2-thio-2,4-imidazolinedione nucleus, and a 5-imidazolinone nucleus, in the presence of a basic condensing agent selected from the group consisting of sodium hydroxide, potassium hydroxide and a tri(lower alkyl)amine, the step comprising heating said compounds together under substantially anhydrous conditions in the presence of a reaction medium consisting of a solvent selected from the group consisting of a tricresylphosphate and a monohydric phenol.

2. In a process for preparing a symmetrical carbocyanine dye comprising heating to a temperature of from 50° to 150° C., two molecules of a benzoxazole lower alkyl salt with one molecule of a tri(lower alkyl)orthocarboxylate in the presence of a tri(lower alkyl)amine, the step comprising heating said compounds together under substantially anhydrous conditions in the presence of a reaction medium consisting of a monohydric phenol.

3. In a process for preparing a symmetrical dibenzothiacarbocyanine dye comprising heating to a temperature of from 50° to 150° C., two molecules of a naphthothiazole lower alkyl salt with one molecule of a tri(lower alkyl)orthocarboxylate in the presence of a tri(lower alkyl)amine, the step comprising heating said compounds together under substantially anhydrous conditions in the presence of a reaction medium consisting of a monohydric phenol.

4. In a process for preparing a symmetrical selenacarbocyanine dye comprising heating to a temperature of from 50° to 150° C., two molecules of a benzoselenazole lower alkyl salt with a molecule of a tri(lower alkyl)orthocarboxylate in the presence of a tri(lower alkyl)amine, the step comprising heating said compounds together under substantially anhydrous conditions in the presence of a reaction medium consisting of a monohydric phenol.

References Cited in the file of this patent

UNITED STATES PATENTS

| | | |
|---|---|---|
| 2,691,652 | Van Lare et al. | Oct. 12, 1954 |
| 2,708,669 | Larive et al. | May 17, 1955 |
| 2,776,280 | Brooker et al. | Jan. 1, 1957 |